United States Patent [19]

Sato

[11] 3,800,314

[45] Mar. 26, 1974

[54] MAGNETIC RECORDING AND/OR REPRODUCING APPARATUS

[75] Inventor: Seiji Sato, Kanagawa-Ken, Japan

[73] Assignee: Sony Corporation, Tokyo, Japan

[22] Filed: May 19, 1972

[21] Appl. No.: 254,918

[30] Foreign Application Priority Data

May 22, 1971 Japan .............................. 46-35010

[52] U.S.Cl. .........360/85, 360/95, 226/91, 242/194

[51] Int. Cl. ......................... G11b 5/00, G11b 15/32

[58] Field of Search ........ 274/4 C, 4 R, 11 C, 11 R, 274/4 A; 242/194, 195; 179/100.2 Z, 100.2 CA; 226/90, 91

[56] References Cited

UNITED STATES PATENTS 3,665,120 5/1972 Larkin .......................... 179/100.2 Z

*Primary Examiner*—Leonard D. Christian

*Attorney, Agent, or Firm*—Lewis H. Eslinger, Esq.; Alvin Sinderbrand, Esq.

[57] ABSTRACT

A magnetic recording and/or reproducing apparatus of the type in which, during recording or reproducing, the magnetic tape extending between supply and take-up reels is wrapped about at least a portion of the periphery of a guide drum for scanning of oblique record tracks on the tape by one or more rotary magnetic heads associated with the guide drum, is provided with a relatively simple automatic tape loading and unloading device that includes a tape engaging pin member engageable, in an inactive position, with the tape between the reels and being movable in an arcuate path about the drum to an operative position for withdrawing tape from the reels and wrapping a portion of the withdrawn tape on the drum periphery while another portion of the tape is engaged with fixedly positioned tape guiding members for holding such other portion of the withdrawn tape away from the guide drum. The tape guiding members preferably include a guiding element, desirably constituted by a rotated capstan, and with which the tape engaging pin member is aligned in its operative position where a tape shifting member acts to transfer the withdrawn tape from the tape engaging pin member to the rotated capstan or guide element.

19 Claims, 9 Drawing Figures

MAGNETIC RECORDING AND/OR REPRODUCING APPARATUS

This invention relates generally to magnetic recording and/or reproducing apparatus, such as, video tape recording and reproducing apparatus (VTR), and more particularly is directed to an automatic tape loading and unloading device for such apparatus.

Existing video tape recording and reproducing apparatus generally comprise a tape guide drum having a rotary magnetic head assembly associated therewith to record or reproduce video signals on a magnetic tape which is usually wound on supply and take-up reels with the tape between such reels being wrapped about at least a portion of the circumferential surface or periphery of the drum and being driven by a cooperating capstan and pinch roller and by suitable rotation of the take-up reel. In preparing such a video tape recording and reproducing apparatus for operation, the tape extending between the supply and take-up reels must be placed around or wrapped about at least a portion of the guide drum periphery so that the tape will be guided thereby with respect to the rotary magnetic head assembly. In the conventional apparatus, it has generally been necessary for the user to manually thread the tape from the supply reel through various guide members, around the guide drum and between the capstan and pinch roller, and then back to the take-up reel. Further, upon the completion of the recording or reproducing of video signals on a particular magnetic tape, it has been necessary for the user to manually remove the tape from the guide drum and then to manually rotate the supply or take-up reel for returning the resulting loose tape to such reel prior to the removal of the reels from the apparatus. The foregoing operations require considerable manual dexterity and are time consuming. If the tape is not properly threaded, damage to the tape and defective recording or reproducing of the signals may result. Further, if there is foreign matter on the user's fingers when handling the tape during the manual loading or unloading of the tape about the guide drum, such foreign matter can be transmitted to the tape and may adversely affect the fidelity of the recording or reproducing of the signals.

Automatic tape loading and unloading devices have been previously proposed to avoid the above mentioned disadvantages. Particularly desirable automatic tape loading and unloading devices for video signal recording and/or reproducing apparatus are disclosed in detail in copending U.S. Patent application Ser. No. 113,988, filed Feb. 9, 1971, and in copending U.S. Patent application Ser. No. 223,552, filed Feb. 4, 1972, and each having a common assignee herewith. In each of the aforementioned automatic tape loading and unloading devices, a rotatable support member, in the form of a ring, extends around the guide drum and carries a plurality of tape guiding members which define an arcuate guide path spaced from the drum, and a tape engaging member is also mounted on the rotatable support member and, upon turning of the rotatable support member or ring in one direction during a loading operation, such tape engaging member is engageable with the tape between the take-up and supply reels for drawing a loop of the tape from one or both of the reels and for wrapping one side of the loop about the guide drum while the other side of the loop is engaged by the tape guiding members and maintained by the latter away from the surface of the guide drum.

Although the above described tape loading and unloading devices, as disclosed in the identified copending applications, are generally satisfactory, such devices require undesirably complex mechanisms for their operations and need to occupy an undesirably large space about the tape guide drum. Further, with the described automatic tape loading and unloading devices, the loading and unloading operations are still not completely reliable.

Accordingly, it is an object of this invention to provide a magnetic recording and/or reproducing apparatus of the described type with an improved tape loading and unloading device by which the wrapping of the tape about the guide drum and the removal of the tape from such drum are effected automatically in a completely reliable manner.

Another object is to provide an automatic tape loading and unloading device, as aforesaid, which is relatively simpler and more compact than the devices previously proposed for that purpose.

A further object is to provide an automatic tape loading and unloading device which occupies a substantially minimized space about the guide drum on which the magnetic tape is to be wrapped and unwrapped.

Still another object is to provide an automatic tape loading and unloading device, as aforesaid, which is capable of accurately predetermining the angular extent of the tape guide drum on which the tape is wrapped during a loading operation of the device, and also capable of accurately predetermining the angle formed by the wrapped tape with respect to the plane of rotation of the rotary magnetic head or heads associated with the guide drum, as in a recording and/or reproducing apparatus in which the head or heads scan oblique or skewed traces across the magnetic tape.

In accordance with an aspect of this invention, a magnetic recording and/or reproducing apparatus of the type in which, during recording or reproducing, the magnetic tape extending between supply and take-up reels is wrapped about at least a portion of the periphery of a guide drum for scanning of oblique or skewed record tracks on the tape by one or more rotary magnetic heads associated with the guide drum, is provided with an automatic tape loading and unloading device that includes a tape engaging pin member engageable, in an inactive position, with the tape between the reels and being movable in an arcuate path about the drum to an operative position for withdrawing a loop of the tape from the reels and wrapping one side portion of the withdrawn tape loop on the drum periphery while the other side of the tape loop is engaged with fixedly positioned tape guiding members which hold such other side of the tape loop away from the guide drum.

In a preferred embodiment of the invention, the tape guiding members may include a rotated guiding element for example, a capstan, with which the tape engaging pin member is aligned in its operative position where a tape shifting member acts to transfer the withdrawn tape loop from the tape engaging pin member to the rotated capstan or guide element, whereupon, if desired, the tap engaging pin member can be returned to its initial position.

The above, and other objects, features and advantages of this invention, will be apparent in the following detailed description of illustrative embodiments thereof which is to be read in connection with the accompanying drawings, wherein.

Figure 1:
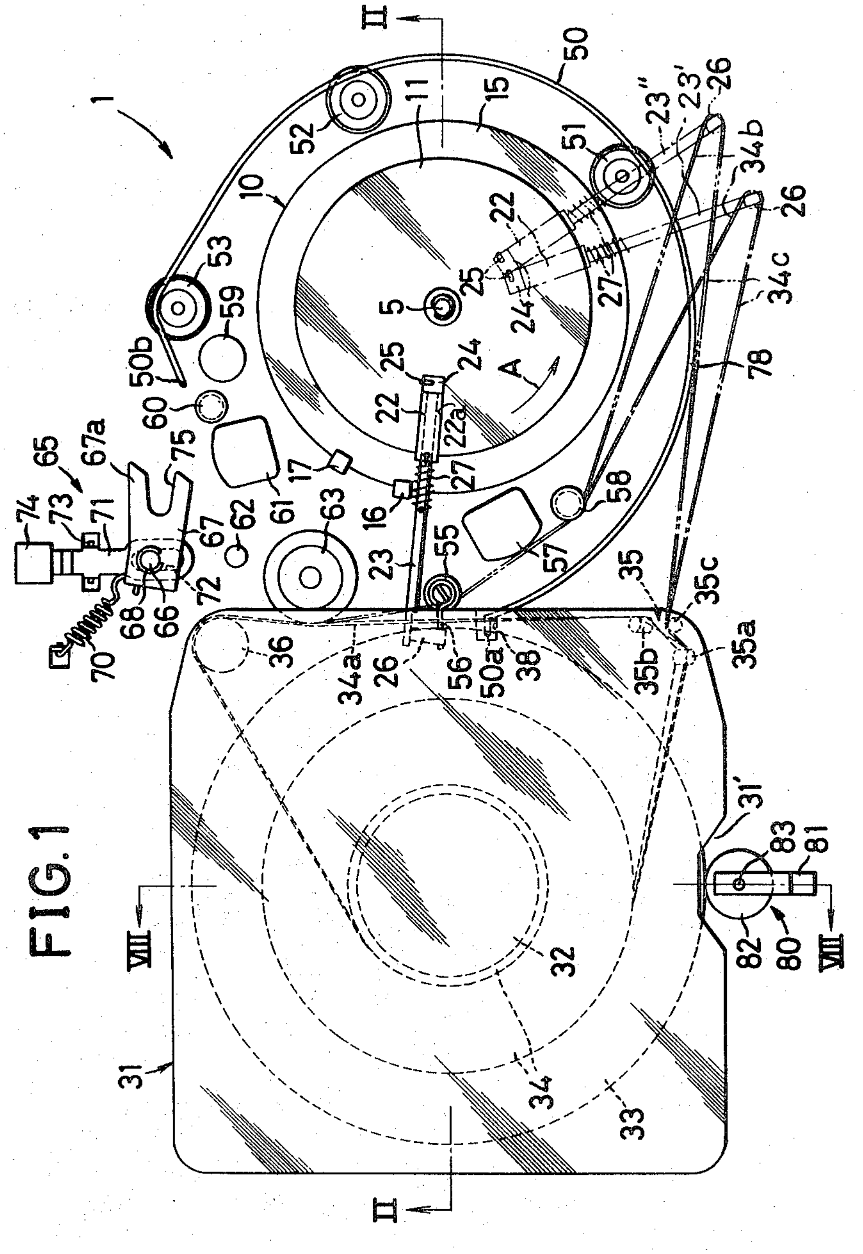
FIG. 1 is a schematic top plan view of a magnetic recording and/or reproducing apparatus having a tape loading and unloading device according to one embodiment of this invention which is shown in full lines at an initial position and which is further shown in broken lines at successive positions during a loading operation of the device.
Figure 2:
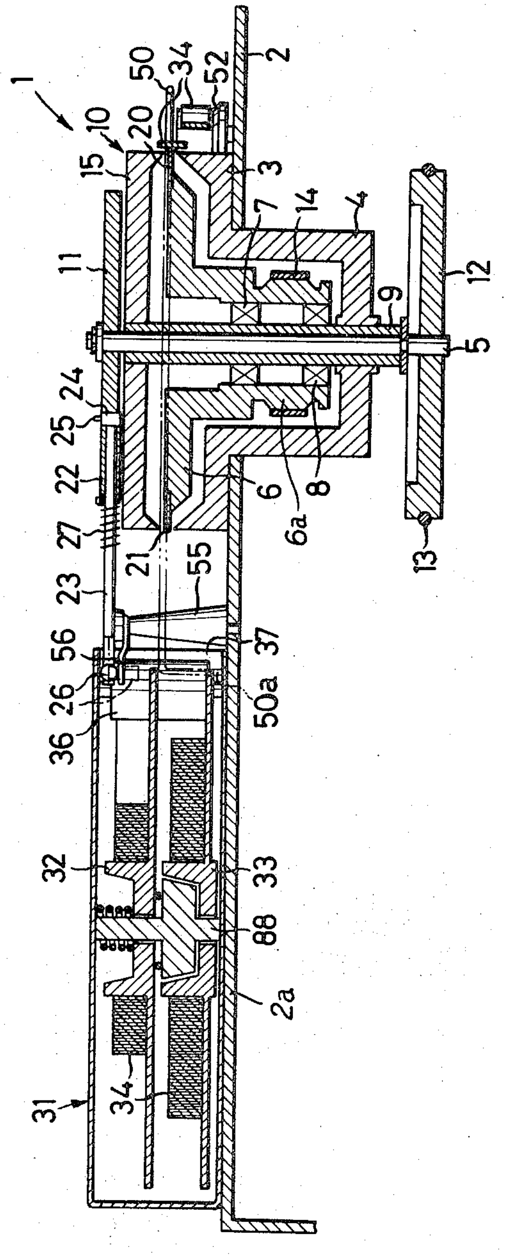
FIG. 2 is a sectional view taken along the line II—II on FIG. 1.
Figure 3:
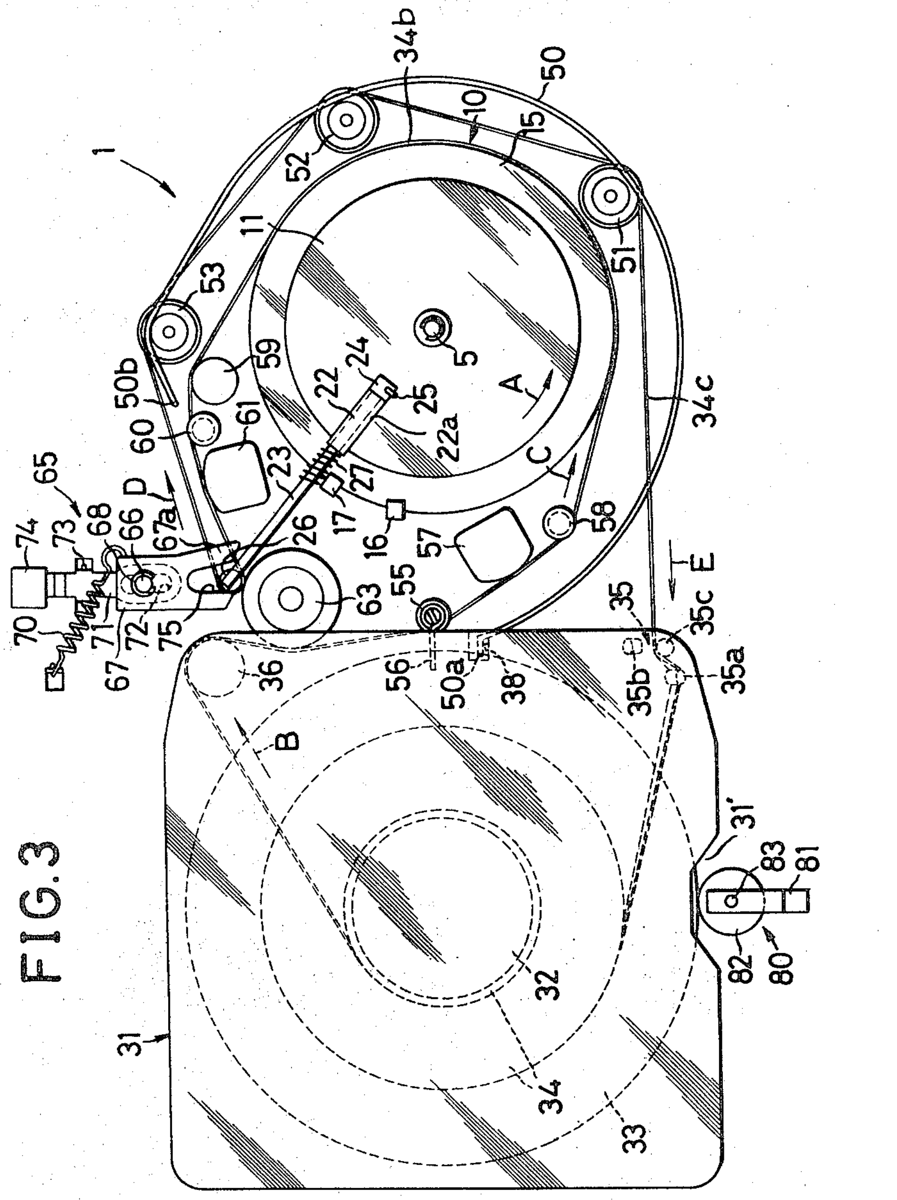
FIG. 3 is a view similar to that of FIG. 1, but showing the tape loading and unloading device in its operative position, that is, at the conclusion of a tape loading operation thereof.

Referring in detail to the drawings, and initially to FIGS. 1,2 and 3 thereof, it will be seen that the present invention is there shown applied to an apparatus 1 which is operative to magnetically record and/or reproduce signals, for example, video signals, on a magnetic tape 34 wound on, and extending between supply and take-up reels 32 and 33 contained within a cassette 31. The so-called VTR or apparatus 1 is shown to include a chassis 2 having a portion constituting a holder 2*a* for receiving and positioning the tape supply constituted by the cassette 31, and a cylindrical tape guide drum 10 which is mounted on chassis 2 so as to be spaced from the holder 2*a* on which cassette 31 is positioned.

As shown, the tape guide drum 10 may include a lower portion 3 fixed on chassis 2 and having a depending hollow cylindrical support member 4 which, at its lower end, carries an upstanding coaxial support tube 9 (FIG. 2). Bearings 7 and 8 are mounted on support tube 9 and rotatably support the cylindrical hub 6*a* of a head carrying disk 6 which has rotary magnetic heads 20 and 21 mounted thereon at diametrically opposed locations. An upper drum portion 15 is fixed on the upper end of support tube 9 and has substantially the same outer diameter as lower drum portion 3. The upper drum portion 15 is spaced axially from lower drum portion 3 to define a circumferential gap therebetween along which heads 20 and 21 are movable in a circular path substantially coinciding with the periphery or circumferential surface of guide drum 10. Rotation of head carrying disk 6 may be effected by means of a driving belt 14 which extends into support member 4 and engages around the cylindrical hub 6*a* and which may be driven by a suitable motor and pulley arrangement (not shown).

Figure 7:
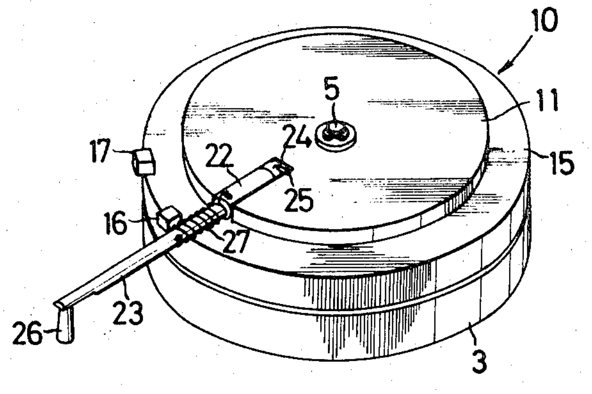
FIG. 7 is a perspective view showing details of the tape engaging member and the supporting structure therefor included in the loading and unloading device of FIGS. 1–3.

When apparatus or VTR 1 is to be conditioned for the recording or reproducing of signals, the tape 34, which is normally fully contained within cassette 31, has to be withdrawn from cassette 31 and loaded or wrapped about at least a portion of the periphery of guide drum 10 so that the rotary heads 20 and 21 associated with the guide drum can scan record tracks that extend obliquely across the magnetic tape. At the conclusion of a recording or reproducing operation of apparatus 1, the cassette 31 can only be removed from the apparatus after the tape wrapped about guide drum 10 has been unloaded or removed from the latter and returned to the reels within cassette 31. In accordance with the present invention, the recording and/or reproducing apparatus or VTR 1 is provided with an automatic tape loading and unloading device that includes a support disk 11 mounted above guide drum 10 on the upper end of a shaft 5 that is turnably mounted within support tube 9 and secured, at its lower end, to a pulley 12. The pulley 12 is engaged by a belt 13 drivable by a suitable mechanism (not shown) for turning support disk 11 about the axis of drum 10. An open ended bearing cylinder 22 is suitably fixed in a radially extending slot 22*a* formed in support disk 11, and turnably receives the inner end portion of a radially directed arm 23 having an enlargement or head 24 at its inner end for preventing the removal of arm 23 from bearing cylinder 22. A stop pin 25 extends from head or enlargement 24 and is selectively engageable with one side or the other of slot 22*a* (FIGS. 1 and 3) for limiting the turning of arm 23 about its longitudinal axis. A tape engaging member 26, preferably in the form of a frustoconical rotary pin or roller, as shown, is mounted at the free end of arm 23 so as to extend at a substantial angle to the longitudinal axis of that arm with the diameter of the pin or roller 26 increasing in the direction therealong away from arm 23. The stop pin 25 is located on arm 23 relative to the tape engaging member 26 so that, when stop pin 25 engages one side of slot 22*a*, tape engaging member 26 depends from rod or arm 23 in a substantially erect position (FIGS. 3 and 7), whereas the tape engaging member 26 extends laterally from arm 23 in a substantially prone position (FIG. 1) when stop pin 25 engages the other side of slot 22*a*. A helical coil spring 27 is provided around arm 23 and has its opposite ends secured to that arm and to bearing cylinder 22 for urging arm 23 to turn about its longitudinal axis to the position at which pin engaging member 26 depends from the arm in a substantially erect position.

The turning of support disk 11 in the clockwise direction, as viewed on FIG. 1, is limited by the engagement of arm 23 with a stop member 16 fixed on the upper drum portion 15 to a position which corresponds with an inactive position of the tape engaging member 26, whereas turning of support disk 11 in the counterclockwise direction of the arrow A is limited by the engagement of arm 23 with another stop member 17 fixed on drum portion 15 so as to then dispose tape engaging member 26 at an operative position thereof (FIG. 3).

Figure 4:
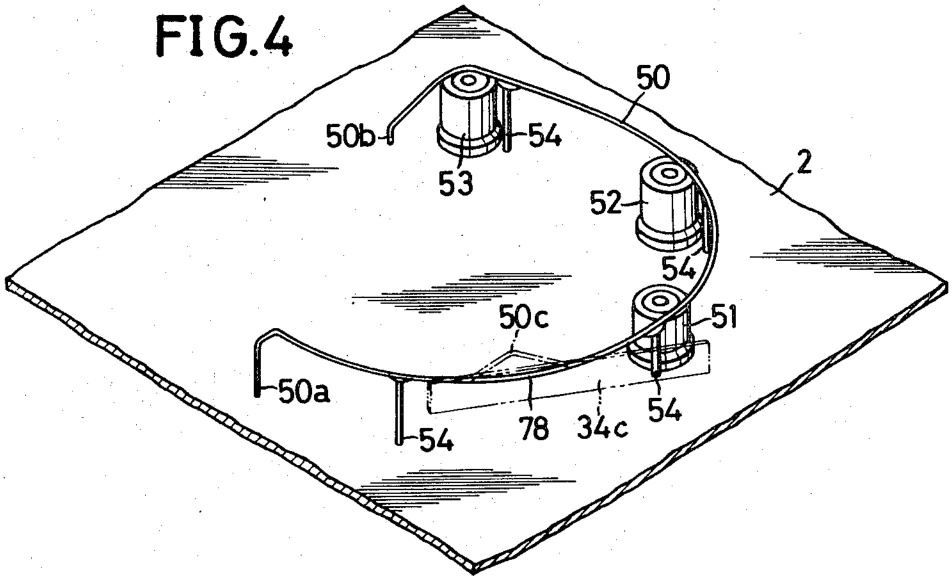
FIG. 4 is a perspective view of the tape guiding members which are included in the tape loading and unloading device of FIGS. 1–3.

The automatic tape loading and unloading device according to this invention is further shown to include a tape guiding assembly fixedly positioned about, and spaced outwardly from tape guide drum 10, and which is shown to include an arcuate guide member 50. The arcuate guide member 50 may be in the form of a curved wire shown to extend through an arc of approximately 270° about drum 10 and being spaced radially from the latter approximately at the level of the circumferential gap between the lower and upper portions 3 and 15 of drum 10. The arcuate guide wire 50 is preferably approximately concentric with drum 10 and lies within the arcuate path of travel of tape engaging member 26 about the center of disk 11. Further, guide wire 50 is arranged so that one of its ends 50*a* is adjacent the location of tape engaging member 26 in the inactive position of the latter (FIG. 1). As shown particularly on FIG. 4, the end portion 50*a* of arcuate guide wire 50 is directed radially outward and then is bent downwardly to extend vertically and have its lower end suitably secured to chassis 20. The opposite terminal or end portion 50*b* of arcuate guide wire 50 is inclined downwardly and similarly secured, at its lower end, to chassis 2. Intermediate its end portions 50*a* and 50*b*, arcuate guide wire 50 is supported at the desired level above chassis 2 by means of a plurality of spaced apart supporting posts 54.

As shown, the tape guiding assembly may further include guide rollers 51,52 and 53 which are mounted for rotation about fixed axes spaced apart along the arcuate guide wire 50. The guide rollers 51,52 and 53 extend upwardly from chassis 2 approximately to the same level as arcuate guide wire 50, and preferably to just below the latter, so as to be engageable with the tape 34 below guide wire 50. Further, the surfaces of rollers 51,52 and 53 which face outwardly away from drum 10, and which are intended for contact with the magnetic tape 34 below guide wire 50, are disposed approximately at the same distance from drum 10 as guide wire 50, as shown on FIGS. 1,3 and 4. The posts 54 which support arcuate guide wire 50 are arranged in relation to guide rollers 51,52 and 53 so that the latter hold the tape out of contact with posts 54. Such spacing of the tape from posts 54 may be achieved either by suitably locating the support posts 54 in relation to the guide rollers, as shown on FIG. 4, or by using the support posts 54 as axles for the rotatable guide rollers 51,52 and 53.

A frusto-conical upwardly tapering guide pin 55 projects upwardly from chassis 2 near the end 50*a* of guide wire 50 so as to be adjacent tape engaging member 26 in the inactive position of the latter. An actuating bar 56 projects outwardly from the upper end of guide pin 55 into the path of movement of the tape engaging member 26 with arm 23. Thus, when disk 11 is turned in the clockwise direction to the position shown on FIG. 1 for disposing tape engaging member 26 at its inactive position, tape engaging member 26 is engaged by actuating bar 56 so as to be turned with arm 23 about the longitudinal axis of the latter against the force of spring 27. Thus, when tape engaging member 26 is in its inactive position, such tape engaging member or pin 26 is made to extend laterally from arm 23 in the substantially prone position shown on FIG. 1.

Between guide pin 55 and guide drum 10 there are provided on chassis 2 an erasing head 57 and a guide pin 58 for determining the vertical position of the tape as the latter passes from cassette 31 to the peripheral surface of guide drum 10. A guide pin 59, which is tapered downwardly, is mounted on chassis 2 between the periphery of guide drum 10 and the end portion 50*b* of guide wire 50 for inclining the tape 34 as the latter leaves the surface of guide drum 10. A guide pin 60 for determining the vertical position of the tape leaving the peripheral surface of guide drum 10 and an audio recroding and/or reproducing head 61 are arranged on chassis 2 adjacent guide pin 59, and a suitably rotated capstan 62 projects upwardly from chassis 2 adjacent audio head 61 so as to be substantially in vertical alignment with the lower end of the tape engaging pin or member 26 when the latter is disposed at its operative position shown on FIG. 3. A rotatable pinch roller 63 is mounted adjacent capstan 62 on a movable support, for example, on a pivoted lever (not shown), so as to be movable between the position of FIG. 1 in which pinch roller 63 is spaced from capstan 62, and the position of FIG. 3 in which pinch roller 63 engages against capstan 62 so as to cooperate with the latter in driving the tape which is engaged about capstan 62 as hereinafter described in detail.

Figure 6:
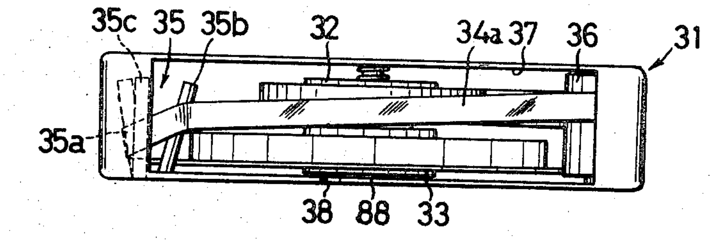
FIG. 6 is a side elevational view of one example of a tape cassette that can be employed in the magnetic recording and/or reproducing apparatus having a tape loading and unloading device according to this invention.
Figure 8:
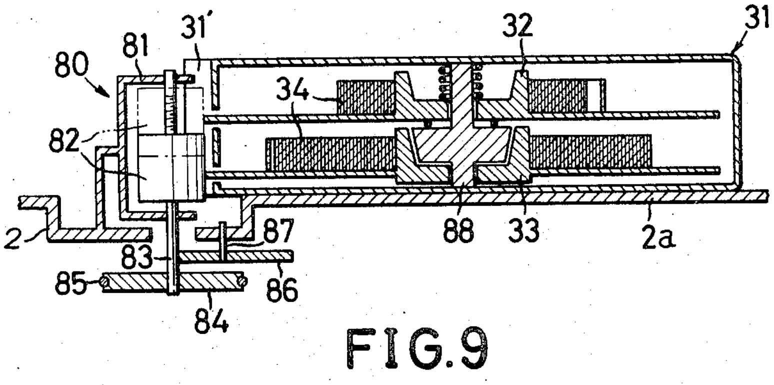
FIG. 8 is a detail sectional view taken along the line VIII—VIII on FIG. 1 for showing the mechanism by which tape reels within the cassette are selectively driven.

Referring now to FIGS. 2,6 and 8, it will be seen that, in the cassette 31 intended for use with the apparatus 1 having a tape loading and unloading device in accordance with this invention, the supply reel 32 and take-up reel 33 are vertically superposed, that is, rotatably mounted one above the other. The magnetic tape 34 extending between the upper supply reel 32 and the lower take-up reel 33 is guided by a guide roller 36 and a guide assembly 35 arranged adjacent the opposite ends of one side of cassette 31 so that a run 34*a* (FIG. 1) of the tape normally extends along the mentioned side of the cassette. Such side of the cassette has an opening 37 (FIG. 6) substantially coextensive therewith for exposing the tape run 34*a* between guide assembly 35 and guide roller 36. In the cassette 31, as shown, the guide assembly 35 includes two obliquely arranged guide pins 35*a* and 35*b* which successively engage the tape 34 when the latter is fully contained within cassette 31, as on FIG. 1, and by which the tape is inclined from the elevated position of supply reel 32 to the relatively lower position of take-up reel 33 (FIG. 6). The guide assembly 35 is further shown to include an upright guide pin 35*c* which is disposed intermediate the oblique guide pins 35*a* and 35*b*, and which is engageable by the tape 34 when the latter is withdrawn from cassette 31, as hereinafter described. It will be apparent that, in place of the oblique guide pins 35*a* and 35*b*, the guide assembly 35 could include an obliquely arranged guide plate for effecting a similar inclination of the tape between the reels 32 and 33.

The holder 2*a* of apparatus 1 is arranged to receive and position the cassette 31, as described above, with the side of the cassette having the opening 37 therealong facing rearwardly, that is, facing toward guide drum 10, and with the free end portion of arm 23, in its inactive position (FIG. 1), projecting forwardly in opening 37 above tape run 34*a* so as to dispose tape engaging member or pin 26 forward of tape run 34*a*. The bottom of cassette 31 has a cutout 38 which communicates with opening 37 so that, when cassette 31 is positioned on holder 2*a*, cutout 38 receives the end 50*a* of arcuate guide wire 50 (FIG. 1).

The reels 32 and 33 in a cassette 21 positioned on holder 2*a* are selectively driven by a reel driving mechanism 80 which is mounted on chassis 2 adjacent one side of holder 2_a_, and which is adapted to extend into a cutout 31′ in a side of each cassette 31 for driving engagement with one or the other of the reels in the cassette (FIGS. 1,3 and 8). As shown particularly on FIG. 8, the reel driving mechanism 80 includes a driving roller 82 having an internally threaded axial bore which receives a screw threaded portion of a shaft 83. The shaft 83 is journalled in a bracket 81 which is resiliently mounted on chassis 2 so as to normally project driving roller 82 into cutout 31′ of a cassette 31 on holder 2_a_ for driving contact with the periphery of reel 32 or reel 33. The shaft 83 is merely rotatable in bracket 81, that is, is held against axial displacement, and has a pulley 84 secured to the lower end of shaft 83 and engaged by a suitably driven belt 85.

During recording, reproducing, or fast forwarding operation of the apparatus 1, that is, when it is desired to unwind the tape 34 from supply reel 32 and rewind the tape on take-up reel 33, shaft 83 is rotated in the counterclockwise direction, as viewed on FIGS. 1 and 3, and the threads on the screw threaded portion of shaft 83 are arranged so that rotation of shaft 83 tends to move driving roller 82 axially downwardly along the shaft to the lower end of the screw threaded portion thereof at which driving roller 82 is in driving engagement with the periphery of take-up reel 33 and spaced axially downward from the periphery of supply reel 32. Thus, take-up reel 33 is rotated about a reel mounting 88 in cassette 31 in the direction for winding the tape 34 thereon, while the unwinding of the tape from supply reel 32 causes corresponding turning of the supply reel about the reel mounting 88.

During rewinding operation of apparatus 1, pulley 84 and shaft 83 are driven in the opposite direction, that is, in the clockwise direction as viewed on FIGS.1 and 3, so that the screw threaded portion of shaft 33 tends to move roller 82 axially upward. Further, in response to such rotation of shaft 83, an eccentric disk 86 rotatable on an axle 87 depending from chassis 2 and being peripherally engageable by shaft 83 is rotated from the position shown on FIG. 8, that is, where a portion of eccentric 86 having a minimum radius engages shaft 83. During such rotation of eccentric 86, portions of the latter having progressively increasing radii engage shaft 83 to move roller 82 laterally toward the left, as viewed on FIG. 8, by reason of the elasticity or resilience of bracket 81, whereby driving roller 82 is moved out of engagement with the periphery of take-up reel 33 during axially upward shifting of roller 82. The eccentric 86 is dimensioned so that roller 82 is held out of engagement with the peripheries of reels 32 and 33 during substantially a full revolution of eccentric 86 from the position indicated on FIG. 8. Further, in the period required for approximately one revolution of eccentric 86, the rotation of shaft 83 causes its screw threaded portion to effect the upward movement of driving roller 82 to the upper end of such screw threaded portion, that is, to the position shown in broken lines on FIG. 8. The driving roller 82 reaches the position shown in broken lines on FIG. 8 for driving engagement with the periphery of supply reel 32 as eccentric 86 nears the completion of a single revolution. At such time, the eccentric 86 is merely in light contact with shaft 83, and such light contact is insufficient to exert a torque of the magnitude required for further rotation in the same direction. Thus, driving roller 82 then drives supply reel 32 in the direction for rewinding the tape 34 thereon while the shaft 83 merely slips or slides relative to eccentric 86.

When the direction of rotation of shaft 83 is thereafter reversed, for example, during a subsequent recording, reproducing or fast forwarding operation of apparatus 1, such reverse rotation of shaft 83 is again initially effective to achieve approximately a full revolution of eccentric 86 during which driving roller 82 is displaced laterally away from the peripheries of reels 32 and 33 while being moved axially downward on the threaded portion of shaft 83 for disengagement from reel 32 and engagement with the periphery of takeup reel 33, as previously described.

Figure 5:
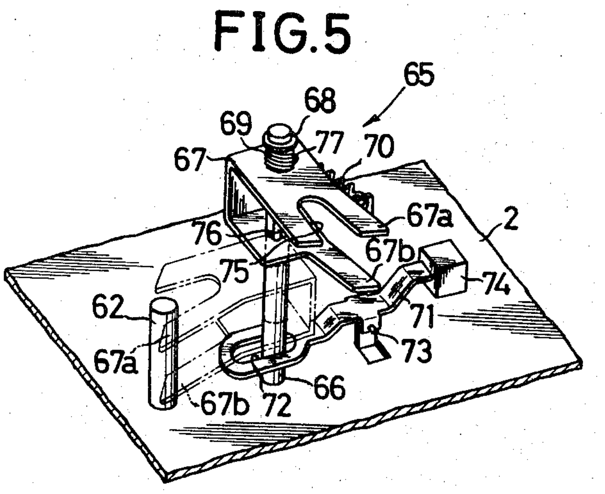
FIG. 5 is a detail perspective view of a tape shifting assembly which is included in the device of FIGS. 1–3.

The illustrated embodiment of an automatic tape loading and unloading device according to this invention is further shown to include a tape shifting or transfer device 65 (FIGS. 1,3 and 5) which is disposed adjacent the rotated capstan 62. The tape shifting device 65 includes a fixed mounting post 66 extending upwardly from chassis 2 for guiding a generally U-shaped tape shifting member 67 which is turnable about post 66 and also vertically movable on the latter. The tape shifting member 67 is shown to have an upper bifurcated arm 67_a_ defining a notch 75 opening at the end of the upper arm, and a lower arm 67_b_ which is spaced downwardly from upper arm 67_a_ by a distance that is only slightly greater than the width of tape 34. A helical compression spring 69 is disposed on post 66 between upper arm 67_a_ and a washer 68 secured to the upper end of the post so that spring 69 yieldably urges tape shifting member 67 downwardly along post 66. A tension spring 70 is secured, at its opposite ends, to tape shifting member 67 and to chassis 2 for yieldably urging member 67 to turn about post 68 to the position shown on FIG. 1 and in full lines on FIG. 5, that is, to the position where the arms 67_a_ and 67_b_ extend substantially at right angles to the direction from post 66 toward capstan 62. The upper end portion of post 66 is formed with a projecting spline or key 76 extending axially therealong and being receivable in a notch or keyway 77 formed in the periphery of the opening of arm 67_a_ which slidably receives post 66. When member 67 is raised so that arm 67_a_ is above the upper end portion of spline 76, spring 70 can then turn tape shifting member 67 to the position shown in full lines on FIG. 5 where keyway 77 is angularly spaced from spline 76 and the latter thereby prevents downward movement of member 67 along post 66 by spring 69. However, when tape shifting member 67 is turned about post 66, as hereinafter described, so that its arms 67_a_ and 67_b_ extend toward capstan 62, keyway 77 comes into alignment with the upper end of spline 76 and spring 69 can then drive member 67 downwardly on post 66 to the position shown in broken lines on FIG. 5, with spline 76 then being received in keyway 77 to hold member 67 against return swinging by spring 70.

The tape shifting device 65 is further shown to include a tape ejecting lever 71 which is rockable about a pivot 73 intermediate its ends, and which has an elongated slot 72 in one end portion loosely receiving post 66 below tape shifting member 67. The opposite end portion of lever 71 has a pushbutton or knob 74 thereon which can be manually or otherwise depressed for elevating the end portion of lever 71 on post 66 and thereby raising member 67 from the level thereof in the position shown in broken lines on FIG. 5 to the level of the member 67 in the position shown in full lines.

It will be apparent that the recording and/or reproducing apparatus VTR 1 having a tape loading and unloading device in accordance with this invention has been described only to the extent required for understanding of the operation of the tape loading and unloading device. In any case, such apparatus 1 and the associated tape loading and unloading device operate as follows:

In preparing the apparatus 1 for operation, a cassette 31 is positioned on the holder 2*a*, preferably by being slidably inserted more or less horizontally thereon in the direction from left to right, as viewed on FIG. 2. With the cassette 31 thus positioned on holder 2*a*, end 50*a* of arcuate guide wire 50 extends into cutout 38 of the cassette, and tape engaging member or pin 26, at its inactive position, extends into opening 37 of the cassette and is prone or directed laterally from arm 23 by reason of its engagement with abutment 56. Thus, tape engaging member 26 passes above run 34*a* of the tape extending along opening 37 as the cassette 31 is being positioned on holder 2*a*. With the cassette 31 positioned on holder 2*a*, run 34*a* of the tape extending between guide roller 36 and guide assembly 35 along opening 37 passes above end portion 50*a* of the arcuate wire guide 50. Further, in the initial condition of the tape loading and unloading device, the tape shifting member 67 is in the position shown on FIG. 1 and in full lines on FIG. 5.

When a fast forward or rewind operation of the apparatus 1 is selected, for example, by the actuation of a respective pushbutton (not shown) the take-up reel 33 or the supply reel 32 is driven by the reel driving mechanism 80 as previously described, and disk 11 remains in the position shown on FIG. 1, that is, with the tape engaging member 26 in its inactive position. Thus, during a fast forward or rewind operation of apparatus 1, the tape 34 remains wholly within cassette 31 and runs directly from one to the other of the reels 32 and 33 by way of the guide roller 36 and guide assembly 35.

When a tape loading operation is to be effected, a respective pushbutton (not shown) may be manually actuated to effect operation of a motor or other mechanism by which the belt 13 is driven to cause turning of pulley 12, shaft 5 and disk 11 in the direction of the arrow A. It will be apparent that, during the corresponding initial movement of arm 23 with disk 11 from the position shown on FIG. 1, tape engaging member or pin 26 is released from abutment 56 so that spring 27 can then turn arm 23 about its longitudinal axis to restore pin 26 to its normal erect position. Thus, as arm 23 continues to move with disk 11 about the axis of shaft 5, pin 26 engages run 34*a* of the tape and withdraws a loop of the tape through opening 37 of cassette 31. As turning of arm 23 continues, for example, through the positions indicated at 23′ and 23″ on FIG. 1, the withdrawn tape loop is progressively extended. Since the reels 32 and 33 are vertically superposed, and since the arcuate guide wire 50 is at a level that is approximately between the reels 32 and 33, the side 34*b* of the withdrawn tape loop which extends from guide roller 36 and which is closest to the periphery of drum 11 is disposed, from the beginning, above the arcuate wire guide 50. Further, the tape engaging pin 26 is shown to move radially outside the arcuate wire guide 50 and at a level above the latter while the other side 34*c* of the withdrawn tape loop, that is, the side extending from tape engaging member 26 toward guide assembly 35 is downwardly inclined therebetween.

As is apparent on FIG. 1, during the movement of arm 23 from the position shown in full lines to the position indicated at 23′, side 34*c* of the tape loop does not come into engagement with the arcuate wire guide 50. However, as arm 23 reaches the position indicated at 23″ on FIG. 1, side 34*c* of the tape loop which is inclined downwardly from tape engaging member 26 to guide assembly 35 may possibly come in contact with arcuate wire guide 50 at the location 78 theralong. However, as the outer side 34*c* of the progressively extended tape loop comes to a position tangential to wire guide 50 at location 78, the inclination of the tape between engaging member 26 and guide assembly 35 is such that wire 50 engages the tape adjacent the upper edge of the latter. Further, as previously described, the tape engaging member 26 is preferably in the form of a frusto-conical rotary pin or roller having its diameter increasing in the direction away from arm 23, that is, in the downward direction whereby the tension in the lower edge of the tape is greater than that along the upper edge of the tape during the progressive withdrawal of the tape loop. Thus, when the upper edge portion of the tape in the outer side 34*c* of the tape loop comes into engagement with wire guide 50 at location 78 along the latter, the relatively high tension along the lower edge portion of the tape assists in guiding the outer side 34*c* of the tape loop under the arcuate wire guide 50. If desired, as indicated at 50*c* on FIG. 4, the portion of the wire guide 50 at location 78 where the side 34*c* of the tape loop may first come in contact with the wire guide can be bent upwardly so as to facilitate and ensure the smooth feeding of the outer side 34*c* of the tape loop under wire guide 50. Although the tape engaging member 26 is shown to move in an arcuate path that is outside of arcuate guide member 50 along the entire length of the latter, it is necessary only that the path of member 26 be outside of the initial portion of guide member 50.

In any event, as arm 23 moves with disk 11 in the direction of the arrow A from the position shown on FIG. 1 to the operative position shown on FIG. 3, the progressively extended or withdrawn tape loop has its outer side 34*c* guided under the arcuate wire guide 50 for engagement with the guide roller 51,52 and 53 by which the tape loop side 34*c* is held away from guide drum 10. The side 34*b* of the withdrawn tape loop which extends from the upper reel 32 at a level above guide wire 50 is engaged with the guide pins 55 and 58 for contact with the erasing head 57 therebetween, and, as turning of disk 11 continues, is wrapped about the periphery of guide drum 10, over an angular extent of approximately 180°. Prior to the arrival of tape engaging member 26 at its operative position which is limited by the engagement of arm 23 with stop 17 (FIG. 3), side 34*b* of the extended tape loop is successively engaged with guide pins 59 and 60 and with audio head 61. Immediately prior to arriving at its operative position, tape engaging member 26 is received by notch 75 in the bifurcated arm 67*a* of tape shifting member 67 which is disposed in the position shown on FIG. 1 and in full lines on FIG. 5. Since member 67 is elevated in such position, the tape 34 on tape engaging member or pin 26 received in notch 75 is engaged between arms 67*a* and 67*b*. In response to the final movement of tape engaging member 26 to its operative position of FIG. 3 while engaged with member 67, the latter is turned against the force of spring 70 from the position shown on FIG. 1 to the position shown on FIG. 3, that is, through approximately 90° so as to align its notch 75 with capstan 62. Upon such turning of tape shifting member 67, the keyway 77 thereof registers with the upper end of spline 76 on post 66 so that spring 69 can then displace member 67 downwardly to the position indicated in broken lines on FIG. 5. Such downward movement of member 67 causes the tape engaged between its arms **67*a* and 67*b* to be displaced downwardly from tape engaging member or pin 26 onto capstan 62 which is axially below pin 26. Upon engagement of the tape with capstan 62, it will be apparent that side 34*b* of the tape loop wrapped upon a portion of the periphery of guide drum 10 will be inclined downwardly from a relatively high position determined by guide pin 58 to a relatively low position determined by guide pin 60 so that rotary heads 20 and 21 trace oblique or skewed record tracks on the tape upon rotation of the head carrying disk 6. Upon the shifting or transfer of the tape from tape engaging member 26 to capstan 62 the tape engaging member 26 may remain positioned axially above the capstan, or disk 11 may be returned in the reverse or clockwise direction, from the position shown on FIG. 3 to the initial or inactive position shown on FIG. 1**.

After the tape 34 has been loaded upon guide drum 10 and engaged with capstan 62, as described above, a recording or reproducing operation of apparatus 1 can be initiated, for example, by manual actuation of a respective control pushbutton (not shown), whereupon conventional control mechanisms forming no part of this invention, and hence not being shown or described, are effective to urge pinch roller 63 against rotating capstan 62 and to drive belt 14 for rotating the head carrying disk 6. In response to the pressure of pinch roller 63 against capstan 62, the tape 34 is driven in the direction of the arrows B,C,D and E on FIG. 3 while the rotated heads 20 and 21 scan the tape for recording or reproducing signals in oblique record tracks. Further, as the tape is thus driven, the driving mechanism 80 is operated to rotate take-up reel 33 for winding the tape thereon, as previously described.

In the above description of the operation of apparatus 1 having a tape loading and unloading device according to this invention, it has been assumed that the tape loading operation and the recording or reproducing operation of the apparatus are separately initiated by the actuation of individual or respective control pushbuttons. However, if desired, the controls of apparatus 1 may be arranged so that, upon the actuation of a recording or reproducing control pushbutton, the turning of disk 11 for effecting the tape loading, as described, the movement of pinch roller 63 against capstan 62, and the rotation of head carrying disk 6 are automatically effected in a predetermined or desired sequence.

It will be noted that, in the described tape loading and unloading device according to this invention, at the conclusion of the tape loading operation, the positioning of the tape wrapped on drum 10 and with respect to the fixed heads 57 and 61 is determined by the guide rollers 51,52 and 53 rotating about fixed axes, by the fixedly positioned guide pins 55,58,59 and 60, and by the capstan 62 rotated about a fixed axis. Thus, the positioning of the tape is very accurately realized without requiring extreme accuracy in the mounting or movement of the tape engaging pin 26 by which the tape is withdrawn from cassette 31 and moved to a position where it is engageable with capstan 62. However, if desired, the tape may remain engaged with the tape engaging member 26 during a recording or reproducing operation, in which case, such tape engaging member 26 may also function as the pinch roller which is urged against a rotated capstan when the member 26 is disposed in its operative position at the conclusion of a tape loading operation.

When it is desired to unload the tape from drum 10, for example, at the completion of a recording or reproducing operation of apparatus 1, the rotation of heads 20 and 21 is halted and pinch roller 63 is returned to its inoperative position spaced from capstan 62, whereupon lever 71 of tape shifting device 65 is rocked, for example, by manually depressing the knob 74, so that the opposite end portion of lever 71 acts upwardly on tape shifting member 67 to raise the latter on post 66. Since the tape is engaged between arms **67*a* and 67*b* of member 67, the upward movement of member 67 on post 66 is effective to strip the tape upwardly off capstan 62**.

If tape engaging member 26 was returned to its inactive position (FIG. 1) following the completion of the loading operation and thus is in such inoperative or inactive position upon the initiation of the unloading operation, the tape stripped upwardly from capstan 62 is thereby released and forms a free loop which is returned to the cassette 31 by rewinding upon one or both of reels 32 and 33. During such return of the tape loop to within casing 31, the downwardly inclined end **50*b* of arcuate wire guide 50 ensures that the bight of the free tape loop will not be snagged by the guide wire. Further, during the return of the tape loop to within cassette 31, the sides 34*b* and 34*c* of the tape loop remain substantially separated by arcuate guide wire 50** so that entangling of the tape loop is avoided.

On the other hand, if tape engaging member 26 remains at its operative position (FIG. 3) upon the completion of the loading operation and during a recording or reproducing operation of apparatus 1, then the tape 34 stripped from capstan 62 in response to actuation of ejecting lever 71, is engaged with member 26 disposed axially above the capstan. Upon the lifting of tape shifting member 67 for transferring or shifting the tape from capstan 62 to tape engaging member 26, arm **67*a* is disposed above spline 76 so that member 67 is free to be turned about post 66 to the position shown in full lines on FIG. 5. Simultaneously with the actuation of ejecting lever 71, the belt 13 engaged with pulley 12 is suitably driven for turning disk 11 in the clockwise direction from the position shown on FIG. 3 to the position of FIG. 1. The corresponding initial movement of tape engaging member 26 accompanies the swinging of member 67 about post 66 and finally effects the withdrawal of member 26 from notch 75 when member 67 is in the position shown on FIG. 1. As disk 11 is turned to move tape engaging member 26 back toward its inactive position of FIG. 1, the resulting slack in the tape is progressively taken up by suitable rotation of one or both of reels 32 and 33. It is desirable that, during a tape unloading operation, the tape being returned to the cassette 31** should be taken-up on the same reel as that from which the tape was withdrawn during a tape loading operation.

As tape engaging member or pin 26 returns to its inactive position (FIG. 1), such member 26 comes into engagement with bar 56 by which arm 23 is turned about its longitudinal axis for disposing tape engaging member 26 in its lateral or prone position above the level of the tape run 34*a* which extends between roller 36 and guide assembly 35 when the tape is fully contained in cassette 31. Consequently, the cassette 31 can then be removed from holder 2*a*, for example, by sliding from right to left on FIG. 1, without any interference from tape engaging member 26.

Figure 9:
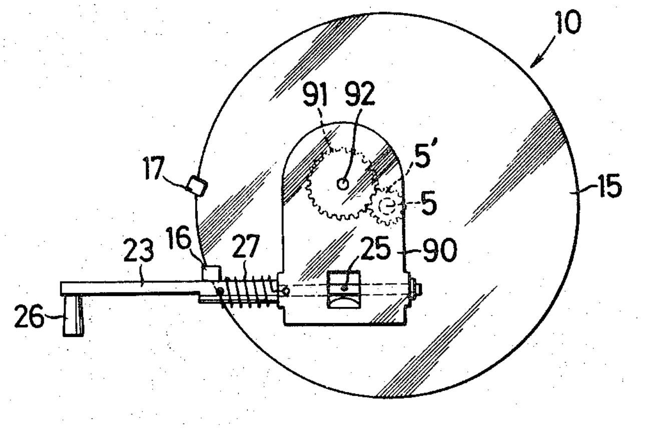
FIG. 9 is a top plan view showing the structure for movably supporting the tape engaging member in a tape loading and unloading device according to another embodiment of this invention.

In the above described embodiment of the invention, the tape engaging member 26 for withdrawing the tape from a cassette 31 and placing the tape in engagement with the fixedly positioned guides and the periphery of guide drum 10 is mounted for movement in an arcuate path that is concentric with drum 10, that is, the axis of rotation of disk 11 coincides with the axis of guide drum 10. However, if desired and as shown on FIG. 9, the tape engaging member 26 can be mounted for movement in arn arcuate path that extends about drum 10 and is eccentric with respect to the latter. For example, as shown, the disk 11 of the first described embodiment may be replaced by a housing 90 having the arm 23 mounted therein for turning about its longitudinal axis, with such housing 90 being rotatable on a shaft 92 that is eccentrically located relative to shaft 5 extending centrally in guide drum 10. A gear 5' may be secured on shaft 5 immediately above guide drum 10 for meshing engagement with a gear 91 secured on shaft 92 under housing 90 so that, when shaft 5 is turned, as previously described with reference to the embodiment of FIGS. 1–8, housing 90 is turned about the axis of shaft 92 for moving tape engaging member 26 in an arcuate path about the guide drum. It will be understood that, apart from the mounting for the tape engaging member 26, the embodiment described above with reference to FIG. 9, is otherwise similar in structure and operation to the embodiment described with reference to FIGS. 1–8.

In each of the previously described embodiments of the invention, displacement of tape engaging member 26 to its laterally directed or prone position for release from the tape is achieved by engagement of the member 26 with actuating bar 56 during the final increment of the return of arm 23 to its inactive position. However, it will be apparent that other means may be employed for displacing tape engaging member 26 to its prone position at such time, for example, a pinion may be provided on arm 23 for engagement with a rack section (not shown) provided on the top of guide drum 10 adjacent stop 16.

When the cassette 31 has its reel 32 and 33 positioned at different levels, for example, vertically superposed, as shown, the arcuate guide member 50 which is preferably employed for selecting the sides of the withdrawn tape loop to be respectively engaged with guide drum 10 and with guide rollers 51,52 and 53 may be omitted. When the reels 32 and 33 are at different levels, the tape engaging member 26 moving at the level of the upper reel 32 during the tape loading operation will ensure that the inner side 34*b* of the withdrawn tape loop passes above tape guide roller 51 into contact with the periphery of guide drum 10, while the outer side 34*c* of the tape loop, being inclined downwardly from tape engaging member 26 to guide assembly 35, will come into engagement with guide roller 51. However, the arcuate fixed guide member 50, which may be an arcuate wire of metal or plastic, as shown, or a suitably curved plate member lying in a horizontal plane, does facilitate and ensure reliable selection of the two sides of the tape loop even in the case of a cassette having superposed reels. Further, when the reels in the cassette are vertically superposed, as in the illustrated cassette 31, the tape for formation of the extended loop during a tape loading operation can be withdrawn from either the upper reel 32 or the lower reel 33. However, in an apparatus according to this invention for use with a cassette having both reels mounted side-by-side therein at the same level, the tape for formation of the tape loop is preferably withdrawn from that reel from which the side of the tape loop to be engaged under the arcuate guide wire 50 extends.

In describing the unloading operation of the device according to this invention, it has been stated that the lever 71 may be manually actuated for stripping the tape from capstan 62 at the commencement of an unloading operation. However, if desired, it is apparent that lever 71 can be otherwise actuated, for example, in response to the energization of a solenoid upon the detection of an end portion of the tape 34 during a recording or reproducing operation of apparatus 1.

Since the loading of the tape from the cassette 31 about guide drum 10 is effected merely by the movement of tape engaging member 26 in an arcuate path about the guide drum, operation of the tape loading and unloading device is simply and reliably effected. Further, since the tape guiding elements which position the tape following a tape loading operation, that is, during a recording or reproducing operation with the tape wrapped about guide drum 10, are all fixedly positioned in relation to the guide drum, the positional relationship of the tape to the guide drum and to the rotary heads is very accurately predetermined. It will also be seen that the space required about guide drum 10 for accommodating the tape loading and unloading device is relatively small so that a compact recording and/or reproducing apparatus can be realized therewith.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention.

What is claimed is:

1. A magnetic recording and/or reproducing apparatus comprising a cylindrical tape guide drum, at least one rotary magnetic head moved in a circular path substantially coinciding with the periphery of said drum, tape supply means containing a magnetic tape, holder means spaced from said guide drum for receiving and positioning said tape supply means, tape engaging means movable from an inactive position, where it is engageable with said tape contained by said tape supply means positioned on said holder means, in an arcuate path that extends about said drum to an operative position for withdrawing a loop of said tape from said supply means and wrapping one side of said loop about at least a portion of said periphery of the drum, and tape guide means fixedly positioned about, and spaced outwardly from said periphery of the drum for engaging the other side of said loop of tape upon movement of said tape engaging means to said operative position and thereby holding said other side of the tape loop away from said drum, said tape guide means including an arcuate member extending about said periphery of the drum at a level between the opposite ends of said drum.

2. An apparatus according to claim 1, in which said tape guide drum has a circumferential slot along which said rotary magnetic head moves, and said level of said arcuate member of the tape guide means substantially coincides with said circumferential slot.

3. A magnetic recording and/or reproducing apparatus comprising a cylindrical tape guide drum, at least one rotary magnetic head moved in a circular path substantially coinciding with the periphery of said drum, tape supply means containing a magnetic tape, holder means spaced from said guide drum for receiving and positioning said tape supply means, tape engaging means movable from an inactive position, where it is engageable with said tape contained by said tape supply means positioned on said holder means, in an arcuate path that extends about said drum to an operative position for withdrawing a loop of said tape from said supply means and wrapping one side of said loop about at least a portion of said periphery of the drum, and tape guide means fixedly positioned about, and spaced outwardly from said periphery of the drum for engaging the other side of said loop of tape upon movement of said tape engaging means to said operative position and thereby holding said other side of the tape loop away from said drum, said tape guide means including a plurality of fixed, upstanding guide posts at locations that are spaced apart about said periphery of the drum and which extend to a height that is intermediate the opposite ends of said drum.

4. An apparatus according to claim 3, in which said tape guide means further includes an arcuate member extending about said periphery of the drum and substantially engaging the upper ends of said guide posts.

5. An apparatus according to claim 4, in which said tape guide means further includes guide rollers located below said arcuate member.

6. A magnetic recording and/or reproducing apparatus comprising a cylindrical tape guide drum, at least one rotary magnetic head moved in a circular path substantially coinciding with the periphery of said drum, tape supply means containing a magnetic tape, holder means spaced from said guide drum for receiving and positioning said tape supply means, tape engaging means movable from an inactive position, where it is engageable with said tape contained by said tape supply means positioned on said holder means, in an arcuate path that extends about said drum to an operative position for withdrawing a loop of said tape from said supply means and wrapping one side of said loop about at least a portion of said periphery of the drum, and tape guide means fixedly positioned about, and spaced outwardly from said periphery of the drum for engaging the other side of said loop of tape upon movement of said tape engaging means to said operative position and thereby holding said other side of the tape loop away from said drum, said tape engaging means including an elongated arm, means engaging one end portion of said arm and mounting the latter for rotation about an axis parallel to the axis of said drum and for turning about the longitudinal axis of said arm with the other end of said arm projecting beyond said periphery of the drum, and a pin member extending from said other end of said arm at a substantial angle with respect to said longitudinal axis so that said turning of the arm about said longitudinal axis is effective to displace said pin member between a substantially erect position for engagement with the tape and a substantially prone position for release from the tape.

7. An apparatus according to claim 6, further comprising drive means for advancing the tape, and in which said pin member is moved adjacent said drive means for engagement of the latter with the tape in response to movement of the tape engaging means to said operative position.

8. An apparatus according to claim 7, in which said drive means includes a rotated capstan above which said pin member is located when said tape engaging means is at said operative position, and further comprising tape shifting means actuable to shift the tape axially between said pin member and said capstan with said tape engaging means at said operative position.

9. A magnetic recording and/or reproducing apparatus comprising a cylindrical tape guide drum, at least one rotary magnetic head moved in a circular path substantially coinciding with the periphery of said drum, tape supply means containing a magnetic tape, holder means spaced from said guide drum for receiving and positioning said tape supply means, tape engaging means movable from an inactive position, where it is engageable with said tape contained by said tape supply means positioned on said holder means, in an arcuate path that extends about said drum to an operative position for withdrawing a loop of said tape from said supply means and wrapping one side of said loop about at least a portion of said periphery of the drum, and tape guide means fixedly positioned about, and spaced outwardly from said periphery of the drum for engaging the other side of said loop of tape upon movement of said tape engaging means to said operative position and thereby holding said other side of the tape loop away from said drum; and in which said tape supply means includes reels having said magnetic tape wound thereon and tape guide members guiding a run of said tape between said reels to extend at a substantial angle to the plane of rotation of said head when said tape supply means is positioned by said holder means, said tape engaging means is engageable, in said inactive position, with said run of the tape so that said loop of tape drawn from said tape supply means by movement of said tape engaging means to said operative position has its opposite sides originating at different levels with respect to said plane of rotation of said head, and said tape guide means includes a plurality of fixed upstanding guide posts at locations that are spaced apart about said periphery of the drum and which extend to a height that is between said levels where the opposite sides of the tape loop originate so that said guide posts are engaged only by said other side of the tape loop.

10. An apparatus according to claim 9, in which said reels of the tape supply means are superposed one above the other with said tape run slanting downwardly from said one reel to said other reel when said tape supply means is positioned by said holder means.

11. An apparatus according to claim 9, in which said tape guide means further includes an arcuate guide member extending about said drum with clearance therebetween and engaging the upper ends of said guide posts so that said other side of the tape loop engages below said arcuate guide member and is held by the latter against upward removal from said guide posts.

12. A magnetic recording and/or reproducing apparatus comprising a cylindrical tape guide drum, at least one rotary magnetic head moved in a circular path substantially coinciding with the periphery of said drum, tape supply means containing a magnetic tape, holder means spaced from said guide drum for receiving and positioning said tape supply means, tape engaging means movable from an inactive position, where it is engageable with said tape contained by said tape supply means positioned on said holder means, in an arcuate path that extends about said drum to an operative position for withdrawing a loop of said tape from said supply means and wrapping one side of said loop about at least a portion of said periphery of the drum, and tape guide means fixedly positioned about, and spaced outwardly from said periphery of the drum for engaging the other side of said loop of tape upon movement of said tape engaging means to said operative position and thereby holding said other side of the tape loop away from said drum; and in which said tape engaging means includes a pin member movable along said arcuate path and also being displaceable between ar erect position for engagement with the tape and a prone position for release from the tape, means urging said pin member to said erect position, and means displacing said pin member to said prone position in response to the presence of said tape engaging means at said inactive position.

13. An apparatus for magnetically recording and/or reproducing signals on a magnetic tape which extends between, and is wound on supply and take-up reels, comprising a cylindrical tape guide drum spaced from said reels, at least one rotary magnetic head moved in a circular path substantially coinciding with the periphery of said drum, tape engaging means engageable, in an inactive position, with the tape between said reels and being movable in an arcuate path about said drum to an operative position for withdrawing tape from at least one of said reels and wrapping a portion of the withdrawn tape about a predetermined extent of said periphery of the drum, tape guiding means fixedly positioned with respect to said drum and spaced from the latter, and tape shifting means for transferring said tape from said tape engaging means, in said operative position of the latter, to said tape guiding means, whereupon the latter guides the tape with said portion of the tape wrapped about said predetermined extent of the drum periphery.

14. An apparatus for magnetically recording and/or reproducing signals on a magnetic tape which extends between, and is wound on supply and take-up reels, comprising a cylindrical tape guide drum spaced from said reels, at least one rotary magnetic head moved in a circular path substantially coinciding with the periphery of said drum, tape engaging means engageable, in an inactive position, with the tape between said reels and being movable in an arcuate path about said drum to an operative position for withdrawing tape from at least one of said reels and wrapping a portion of the withdrawn tape about a predetermined extent of said periphery of the drum, tape guiding means fixedly positioned with respect to said drum and spaced from the latter, and tape shifting means for transferring said tape from said tape engaging means, in said operative position of the latter, to said tape guiding means, whereupon the latter guides the tape with said portion of the tape wrapped about said predetermined extent of the drum periphery; and in which said tape engaging means includes a pin member supported at one end for movement in an erect position along said arcuate path, said tape guiding means includes a guiding element which is substantially in end-to-end alignment with said pin member in said operative position of the tape engaging means, and said tape shifting means includes means actuated by the final increment of movement of said tape engaging means to said operative position for displacing the tape axially from said pin member onto said guiding element.

15. An apparatus according to claim 14, in which said tape shifting means further includes ejecting means operable to strip the tape from said guiding element.

16. An apparatus according to claim 15, in which said guiding element has a cylindrical surface and is rotated about its central axis to constitute at least part of tape drive means by which the tape is advanced while having said portion thereof wrapped about the drum periphery.

17. An apparatus for magnetically recording and/or reproducing signals on a magnetic tape which extends between, and is wound on supply and take-up reels, comprising a cylindrical tape guide drum spaced from said reels, at least one rotary magnetic head moved in a circular path substantially coinciding with the periphery of said drum, tape engaging means engageable, in an inactive position, with the tape between said reels and being movable in an arcuate path about said drum to an operative position for withdrawing tape from at least one of said reels and wrapping a portion of the withdrawn tape about a predetermined extent of said periphery of the drum, tape guiding means fixedly positioned with respect to said drum and spaced from the latter, tape shifting means for transferring said tape from said tape engaging means, in said operative position of the latter, to said tape guiding means, whereupon the latter guides the tape with said portion of the tape wrapped about said predetermined extent of the drum periphery, and additional tape guiding means fixedly positioned about said drum and spaced from the latter for engaging another portion of said withdrawn tape and holding said other tape portion away from said drum in response to said movement of the tape engaging means along said arcuate path toward said operative position.

18. An apparatus according to claim 17, in which said additional tape guiding means includes a plurality of upright guide members spaced from each other and from said periphery about said drum and an arcuate guide member joined to the upper ends of said upright guide members and being located approximately at the level of the plane of rotation of said head for holding said other portion of the withdrawn tape on said upright guide members while the first mentioned portion of the withdrawn tape can pass over said arcuate guide member for engagement with the drum periphery.

19. An apparatus according to claim 18, in which said supply and take-up reels are superposed one above the other.

* * * * *